J. GARRITY.
Combined Cut-Off Cam.
No. 220,278.  Patented Oct. 7, 1879.
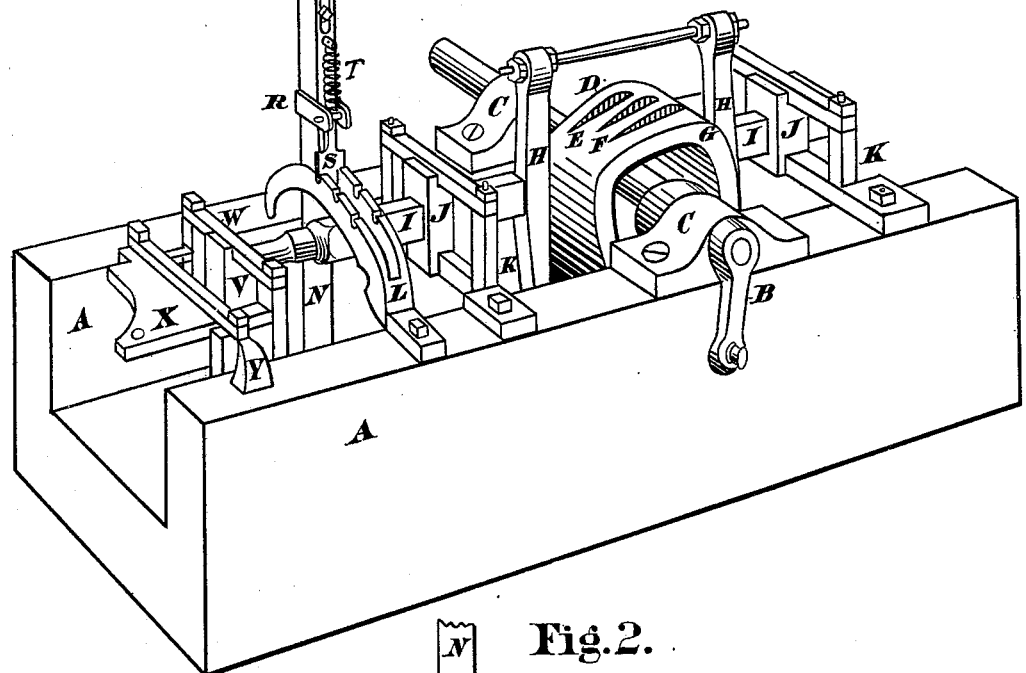
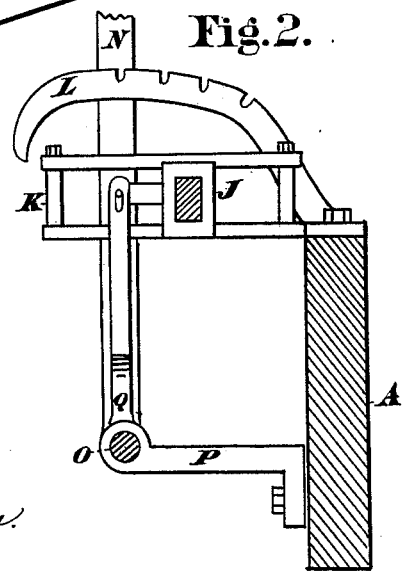
WITNESSES.
Frank Pardon
C. Hewitt
INVENTOR,
John Garrity
by J. G. Hewitt
Attorney

UNITED STATES PATENT OFFICE.

JOHN GARRITY, OF LOUISVILLE, KENTUCKY.

IMPROVEMENT IN COMBINED CUT-OFF CAMS.

Specification forming part of Letters Patent No. 220,278, dated October 7, 1879; application filed May 31, 1879.

*To all whom it may concern:*

Be it known that I, JOHN GARRITY, of the city of Louisville, in the county of Jefferson and State of Kentucky, have invented a certain new and useful Improvement in Combined Cut-Off Cams with Adjustable Yoke for Steam-Engines; and I do hereby declare that the following is a full, clear, and exact description of the construction and operation of the same, reference being had to the accompanying drawings, forming part of this specification, and to the letters of reference marked thereon.

Figure 1 is a perspective view of the device, showing the general construction of its several parts. Fig. 2 is a sectional view, showing the rock-shaft and stands with the arm and lever for shifting the yoke.

This my invention relates to a certain new and useful improvement in steam-engines, consisting more especially in a combination of cut-off cams with adjustable yoke, the object of which is to provide a cheap, simple, and convenient means for changing the power of a steam-engine by cutting off the steam either at half, five-eighths, three-quarters, or seven-eighths of the stroke of the piston, allowing the remainder to be completed by the expansive force of the steam without the use of additional machinery or loss of time in making the change, which makes it very important, particularly when an immediate change is required either to increase or diminish the power of the engines, and also as a means for economizing in the use of steam in cases where the boiler-surface is insufficient or necessity requires inferior fuel to be used.

A represents a part of the engine-timbers or bed-frame, only one of which is used at that particular point when applied to steamboats. B is the crank and main shaft. C C are the journal-bearings. D is a half-stroke cam. E is a five-eighths, F is a three-quarters, and G is a seven-eighths cam, all of which are combined and cast in one piece, so formed as to cut off the steam at the above-described points when secured permanently on the main shaft. H H is an adjustable yoke, which is made in form as shown in the drawings, with square slides I I at each end. These slides are made to work in movable bearings or blocks J J, which support the yoke. In order to shift the yoke from one cam to another the blocks are made to move loosely from side to side in stands or elongated frames K K, secured to the timber or bed-frame for the purpose.

L is an arch-bar, secured to the timber, with notches in the top for holding the yoke in position when set. N is a lever for shifting the yoke H, and O is the shaft on which it turns. P is one of the shaft bearings or stands, only one of which is shown, two being used. Q is an arm on shaft O, connecting with the blocks J J by means of a lug on the back, for the purpose of shifting them back and forth in the frame to change the yoke. R is a clamp for holding the catch-bar U in position. S is the catch, and T is a spiral spring for holding it down when set. V is a block fastened to the end of the yoke-slide, and is made to work loosely in the opening of the frame W, so as to slide back and forth as the yoke is changed. This frame W is made in form as shown in the drawings, and by means of the flat plate X connected therewith, constitutes the means of connecting it with the cam-rods. Y is the bearing for supporting the plate X of frame W.

Having thus fully described the nature and object of my invention, its operation consists in simply changing the yoke from one cam to another, thereby enabling the engineer to regulate the power of his engine by working more or less steam.

What I claim as my invention, and desire to secure by Letters Patent, is—

1. A variable cut-off composed of the many-faced cams and an adjustable sliding yoke, in combination with a sliding bar and block or bearing at each end of the yoke, and supports therefor, substantially as described.

2. A variable cut-off having a many-faced cam and an adjustable yoke, in combination with slides I, a block, V, and plate or table X, substantially as and for the purpose described.

JOHN GARRITY.

Witnesses:
 FRANK PARDON,
 C. HEWITT.